June 30, 1953 L. C. MILLER 2,643,620
EXTRUSION DEVICE
Filed Nov. 22, 1948 6 Sheets-Sheet 1

LEONIDAS C. MILLER
INVENTOR.

BY Lyon & Lyon
ATTORNEYS

June 30, 1953  L. C. MILLER  2,643,620
EXTRUSION DEVICE
Filed Nov. 22, 1948  6 Sheets-Sheet 2

LEONIDAS C. MILLER
INVENTOR.

BY Lyon & Lyon
ATTORNEYS

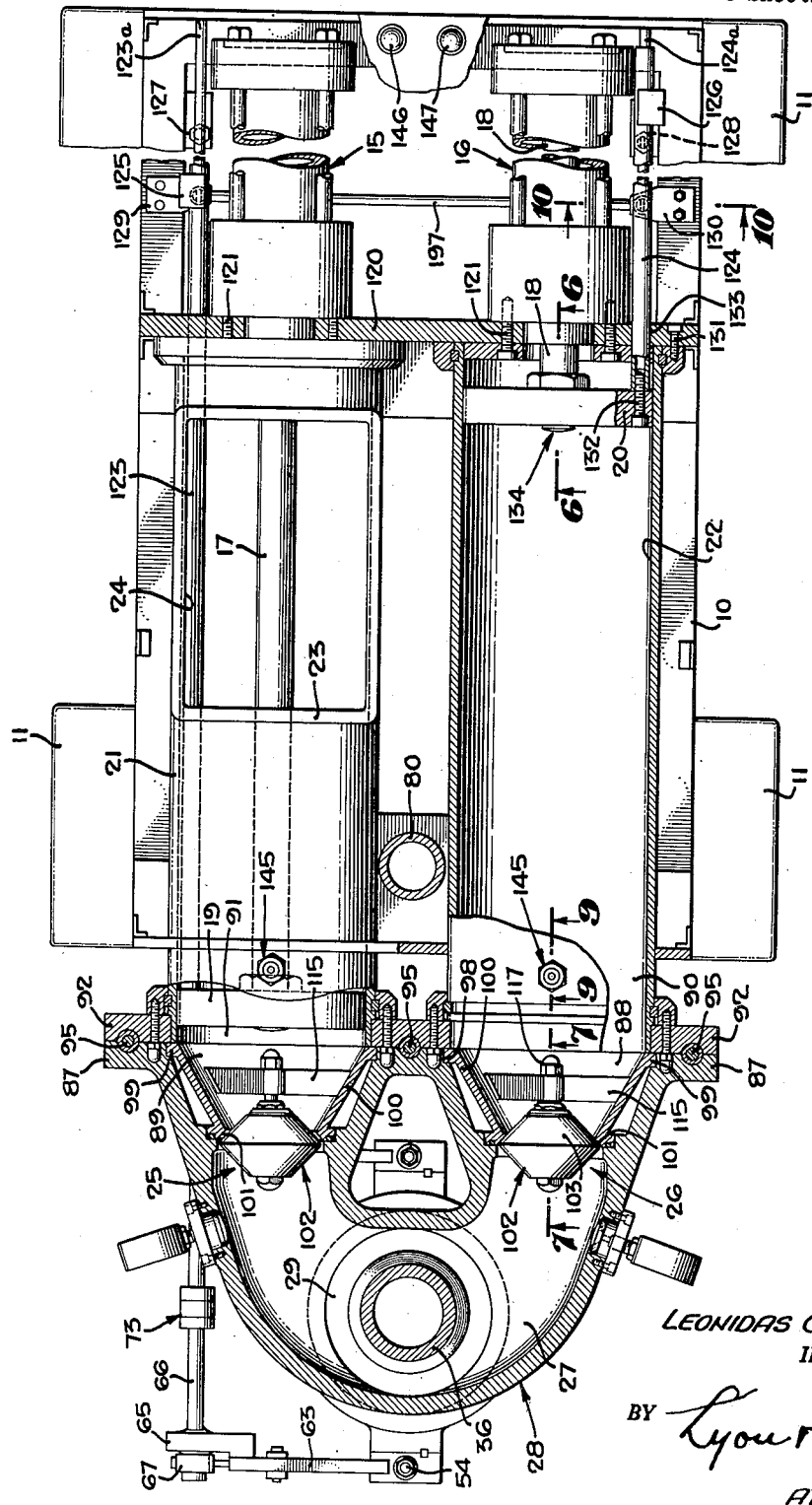

June 30, 1953

L. C. MILLER 2,643,620

EXTRUSION DEVICE

Filed Nov. 22, 1948

LEONIDAS C. MILLER
INVENTOR.

BY Lyon & Lyon
ATTORNEYS

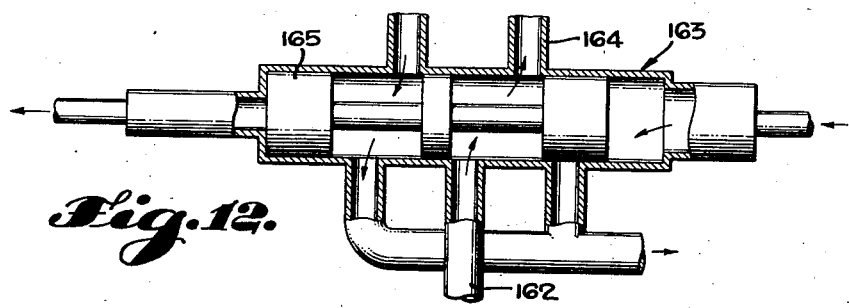
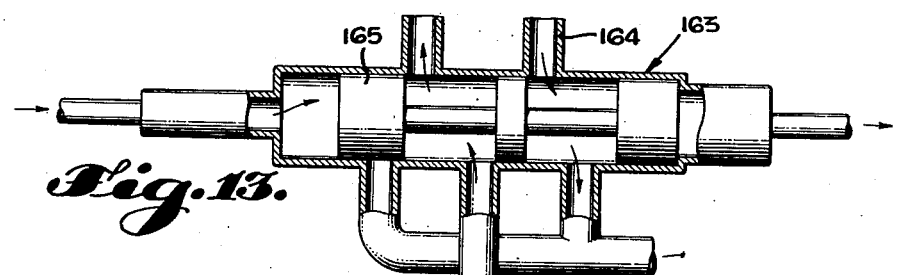
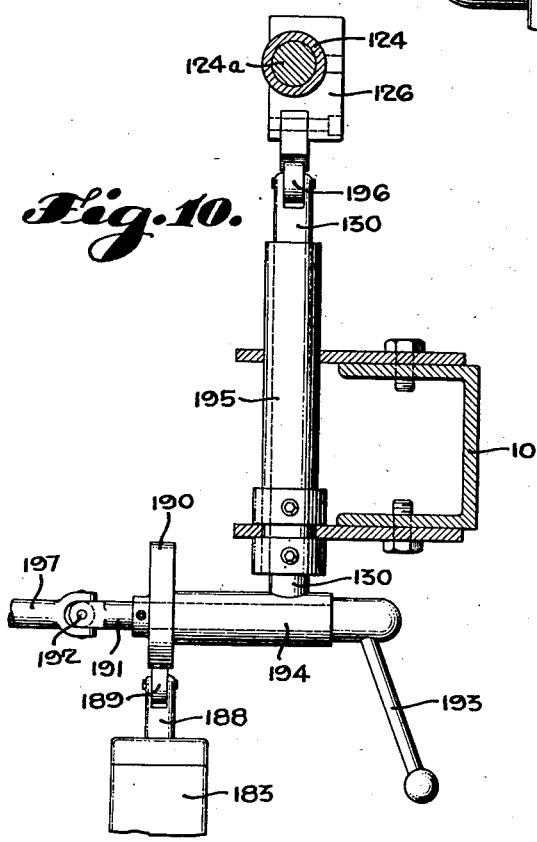
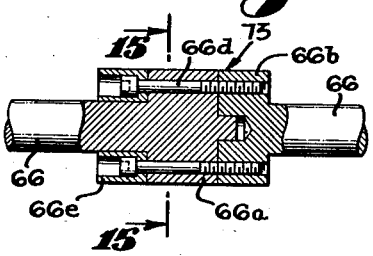
LEONIDAS C. MILLER
INVENTOR.
BY Lyon & Lyon
ATTORNEYS

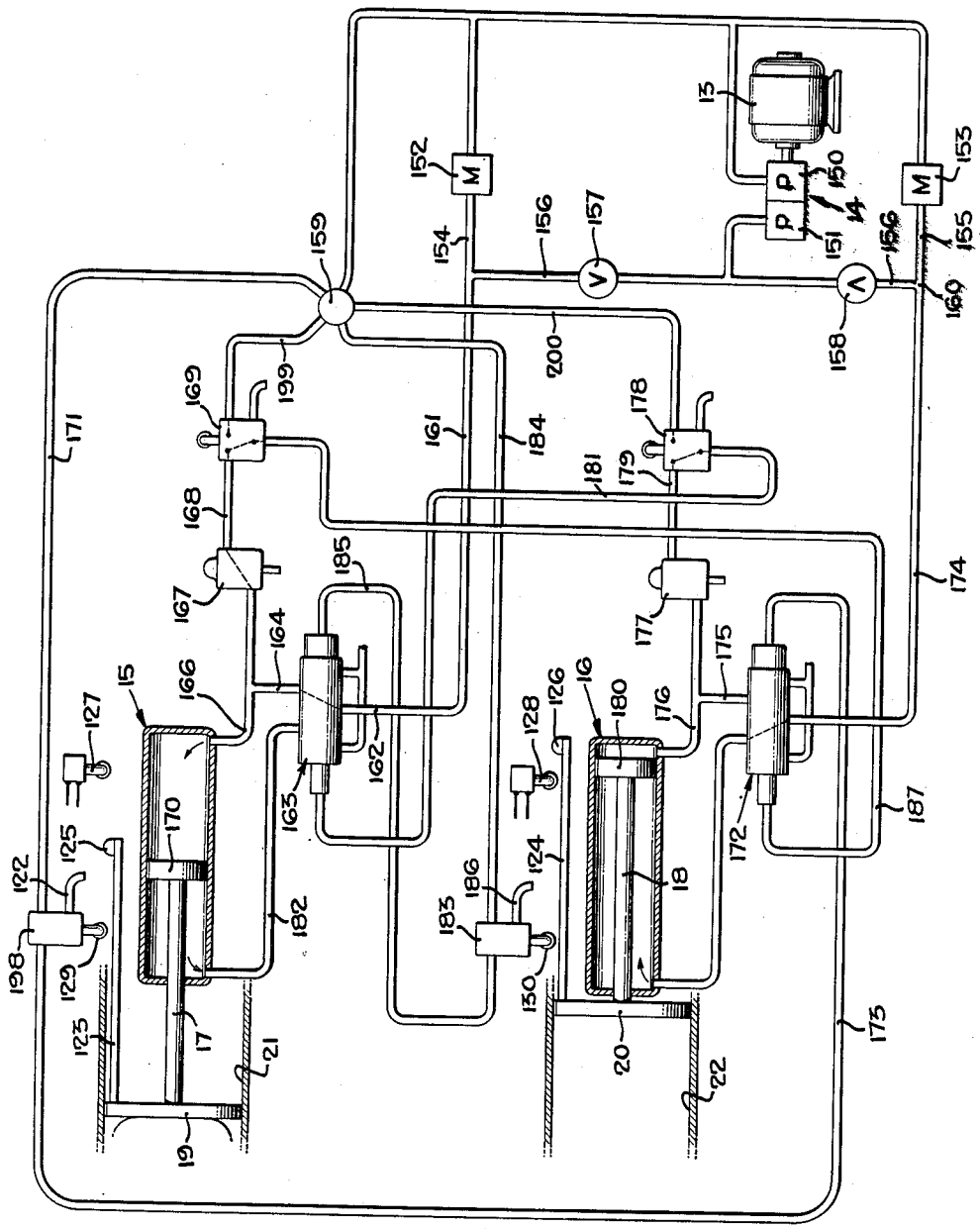

Patented June 30, 1953

2,643,620

UNITED STATES PATENT OFFICE 2,643,620

EXTRUSION DEVICE

Leonidas C. Miller, Los Angeles, Calif.

Application November 22, 1948, Serial No. 61,419

21 Claims. (Cl. 107—14)

This invention relates to apparatus for extruding material and has been found particularly useful in connection with devices for extruding a food product.

An important object of this invention is to provide an extrusion device for extruding material supplied from a plurality of reciprocating piston and cylinder assemblies in a manner so that the extrusion pressure remains substantially constant during the complete operating cycle of the machine.

Another object is to provide an extrusion device employing a plurality of reciprocating elements feeding a common discharge passage in which means are provided for maintaining the pressure in the discharge passage substantially constant during the change-over interval when a first reciprocating element reaches the end of its operative stroke and a second reciprocating element begins its operative stroke.

Another object is to provide a device of this type having a novel form of hydraulic system functioning to provide both rapid traverse and slow traverse for the reciprocating elements and for actuating the elements in a manner to maintain substantially constant pressure in the discharge passage.

Another object is to provide a device of this type which may be operated manually under the control of an operator, and which is provided with a novel control system whereby it repeats its operating cycle automatically, requiring only that the material for extrusion be supplied to the device at the proper intervals in its operating cycle.

A more particular object is to provide an extrusion device having an extrusion head provided with a passageway terminating in an orifice, together with a member adjustably positioned within the passageway for varying the size of the orifice.

Another object is to provide an extrusion device having a novel form of adjustment means for varying the size of a ring type orifice.

A further object is to provide novel forms of check valves interposed between the reciprocating elements and the extrusion passage.

Other objects and advantages will appear hereinafter.

Figure 3 is a sectional plan view partly broken away showing details of construction of the two feed cylinders and showing their common discharge head.

Figure 10 is a sectional elevation taken substantially on the lines 10—10 as shown in Figure 3.

Figure 11 is a diagrammatic view showing the hydraulic circuits for reciprocating the pistons.

Figures 12 and 13 are diagrammatic views showing porting of the four-way control valves.

Figure 14 is a sectional view taken substantially on the lines 14—14 as shown in Figure 4.

Figure 15 is a sectional elevation taken substantially on the lines 15—15 as shown in Figure 14.

Figure 1:
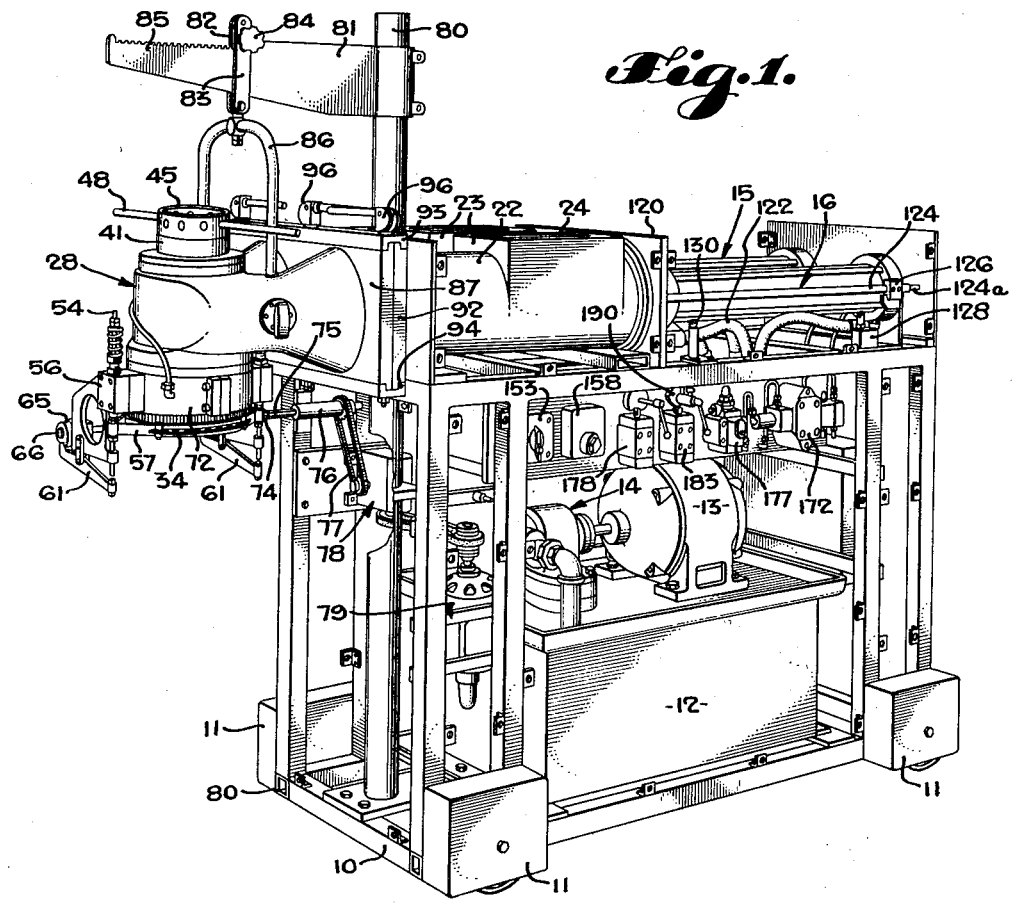
Figure 1 is a perspective view of a preferred embodiment of my invention, the guards and covers being removed to show details of construction.
Figure 8:
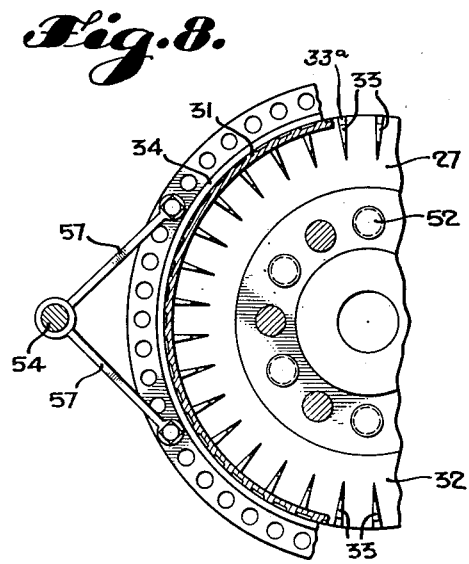
Figure 8 is a sectional plan view partly broken away taken substantially on the lines 8—8 as shown in Figure 4.

Referring to the drawings, a frame or base 10 is provided with suitable supporting wheel assemblies 11 and supports an oil reservoir 12. An electric motor 13 resting on the upper plate of the oil reservoir 12 is direct connected to drive a double pump assembly 14. Pressure fluid delivered by the pump assembly 14 is used for actuating alternately a pair of power cylinder assemblies 15 and 16. Each of these power cylinder assemblies is carried on the frame and each may be of conventional design. Piston rods 17 and 18 actuated by these assemblies 15 and 16 move the feed pistons 19 and 20 respectively within the corresponding feed cylinders 21 and 22. The feed cylinders 21 and 22 are substantially duplicates and each supports a lateral projection 23 providing an upwardly facing opening 24. The material to be extruded is inserted into the feed cylinders through the openings 24.

The material to be extruded, which in this case constitutes a food product, is moved forwardly in one of the feed cylinders by the forward motion of the piston in that cylinder, and the material passes through one of the check valve assemblies 25 and 26 into the central chamber 27 of the extrusion head assembly generally designated 28.

Figure 4:
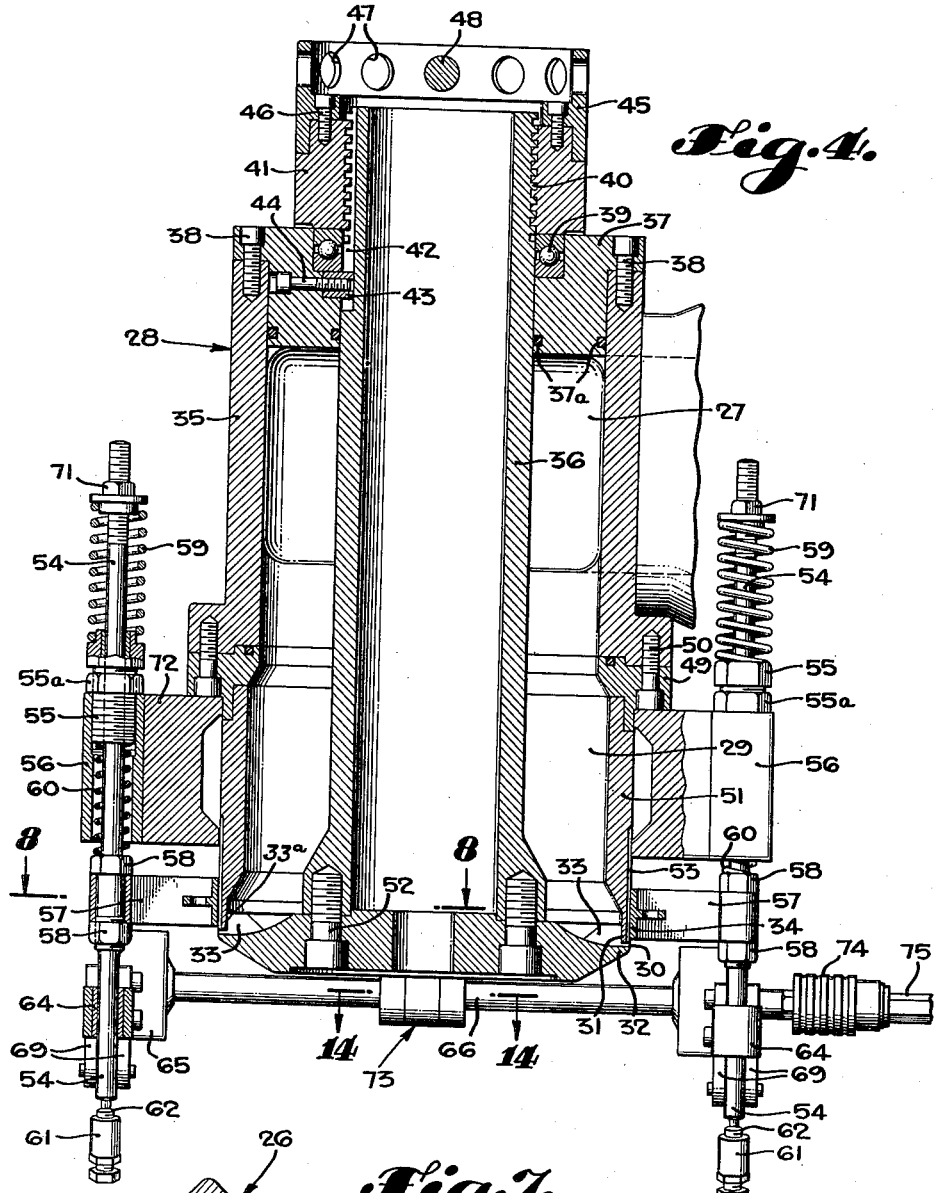
Figure 4 is a sectional elevation through the extrusion head.

This material then passes downwardly through the annular space 29 as shown in Figure 4 and radially outwardly through the annular discharge port 30 formed between the lower end of the cylindrical rim 31 and the upper surface of the cap 32. The annular port 30 is continuous, but directly in advance thereof the flow of material is interrupted at intervals by a series of radial fins 33 carried on the cap 32. The extruded material passes outwardly through the annular port 30 and is chopped off at intervals by means of the oscillating cutter 34. The short strips of material thus formed drop by gravity into a cooking vat (not shown).

Considering the operative parts of this apparatus in more detail, the extrusion head 28 includes a casing 35 which encircles a central hollow shaft 36. A closure 37 is secured to the casing 35 by any convenient means such as, for example, by the cap screws 38, and carries a ball bearing assembly 39. The upper end of the hollow shaft 36 is provided with external threads 40 adapted to receive the corresponding internal threads formed on the nut 41 which rests on the bearing assembly 39. Means are provided for preventing relative rotation between the casing 35 and the hollow shaft 36, and as shown in the drawings this means includes a keyway 42 formed axially in the upper end of the outer surface of the hollow shaft 36 and adapted to receive the key 43 carried on the inner end of the fitting 44 mounted on the closure 37. The nut 41 is provided with means whereby it may be turned in order to advance and retract the shaft 36 axially within the housing 28. As shown in the drawings this means includes an apertured ring 45 secured to the upper end of the nut by means of the attachment fittings 46 and provided with a series of openings 47 for reception of a transverse bar 48. Concentric packing rings 37a prevent leakage between the closure 37 and the casing 35 and between the closure 37 and the shaft 36. A connection ring 49 is attached to the lower end of the casing 35 by means of attachment fittings 50, and this connection ring is press fitted with relation to the removable wear sleeve 51 which carries the rim 31 at its lower end. The ring 49, sleeve 51 and rim 31 are mounted coaxially of the central hollow shaft 36. The removable wear cap 32 is secured to the lower end of the shaft 36 by means of the connection fittings 52.

From this description it will be understood that rotation of the nut 41 by means of the bar 48 in the openings 47 serves to adjust the spacing of the cap 32 and the rim 31 and thereby vary the width of the ring orifice 30. This in turn controls the thickness of the extruded strips of food material. This is an important feature of my invention since it provides very accurate control of the thickness of the extruded strips. Furthermore, this feature insures uniformity of thickness throughout the peripheral length of the ring orifice 30, by greatly facilitating the ease of removing accumulations of material from the orifice-defining parts. Since the cooking time must be the same for each of the strips extruded, and since the thickness of the strips must be accurately regulated with relation to the time of cooking for optimum results, it is very important that there be no variation in thickness during any part of the cycle of operation of the machine. The constructional features just described which provide accurate control for the thickness of the extruded strips are also important for ease of disassembly for periodic cleaning. The projections 33a formed at the outer ends of each of the fins 33 may contact the lower end of the rim 31 to provide a stop to limit the upward travel of the stem 36. This stop means control the minimum thickness of the extruded strip of material.

The oscillating cutter 34 reciprocates vertically on the outer cylindrical surface of the sleeve 51 and rim 31. This surface may be interrupted by axially extending grooves 53 to reduce the surface area in contact with the reciprocating cutter 34. Guide rods 54 are mounted to slide vertically within bushings 55 carried on radially projecting lugs 56. These lugs 56 are carried on a split ring 72 which encircles the ring 49. The ring-shaped cutter 34 which encircles the cylindrical rim 31 is provided with arms 57 which are secured at their outer ends to the guide rods 54 by means of the nuts 58.

Figure 5:
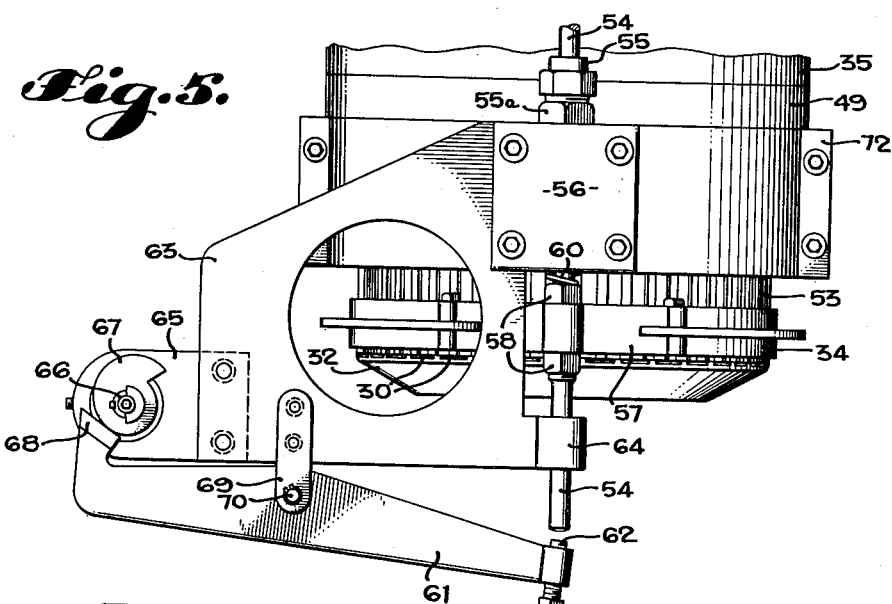
Figure 5 is a side elevation of the extrusion head and cutter mechanism looking at the left side of the device as viewed in Figure 4.

Pairs of compression springs 59 and 60 encircle each of the rods 54 and serve to provide a floating mounting for the rods and for the cutter 34. The upper springs 59 are considerably larger than the lower springs 60 with the result that the assembly, including the cutter 34 and rods 54, normally remains at rest with the parts in the position shown in Figure 4. The normal height of the cutter 34 may be adjusted without varying the spring settings by turning the threaded bushings 55 relative to the lugs 56, and then locking them in adjusted position by means of the lock nuts 55a. Means are provided for lifting the rods 54 at intervals to actuate the cutter. As shown in Figure 5, this means may include rocker arms 61 having adjustable contacts 62 at their extending ends for engaging the lower ends of the rods 54. Stationary brackets 63 provide guide bearings 64 for the rods 54 and also provide a support for the bearing housings 65 for the cam shaft 66. Cams 67 keyed to the cam shaft 66 operate against followers 68 formed on the rocker arms 61. Straps 69 provide pivots 70 about which the rocker arms 61 operate. Rotation of the cam shaft 66 causes the rocker arm 61 to oscillate, as will be readily understood. Upward movement of the rods 54 carries the cutter 34 with them, and upon return travel in a downward direction the inertia of the rods 54 and cutter 34 carry them beyond their normal position of rest, with the result that the cutter 34 chops off material extruded through the circular orifice 30, and quickly returns.

Adjusting nuts 71 are provided on the rods 54 for adjusting the compression of the springs 59 so that the amount of over-travel of the cutter 34 may be regulated as desired independently of the effective stroke of the cams 67. The cam shaft 66 may be formed in two parts and connected by means of an angularly adjustable coupling 73. An enlarged flange on the end of the shaft section 66a is provided with arcuate slots 66c through which cap screws 66d extend axially. These cap screws are threaded into the enlarged companion flange on the end of the shaft section 66b. A ring 66e encloses the heads of the cap screws. This coupling assembly 73 may be angularly adjusted initially to cause the cams 67 to operate in synchronism, and also provides angular adjustment to compensate for uneven wear.

A disconnecting coupling 74 is provided at one end of the cam shaft 66 for connecting the cam shaft 66 in driving relation with the power shaft 75. As shown in Figure 1, this power shaft 75 is carried in a bearing 76 positioned on the frame 10 and is adapted to be driven by a chain 77 from a right angle drive unit 78. This unit 78 is driven by a variable speed drive from the vertically disposed motor 79 carried on the frame 10.

Figure 2:
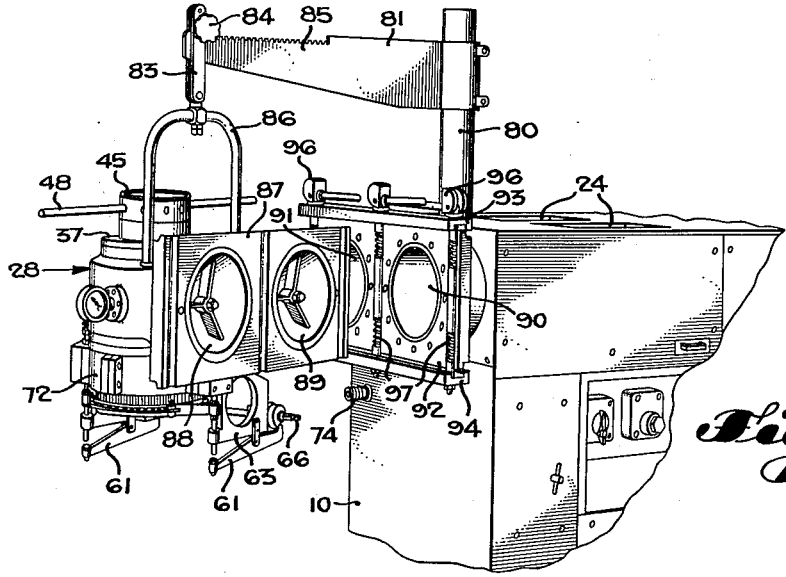
Figure 2 is a perspective view partly broken away showing the extrusion head assembly removed for purposes of inspection and cleaning.

The extrusion head 28 is removably mounted on the frame 10 and a quick connection is provided so that it may be disconnected for inspection, cleaning or repair. As shown in Figure 1 a vertical post 80 extends upwardly from the base of the frame and projects above the level of the extrusion head 28. Horizontal arm 81 extends from the post and supports a toothed wheel 82 carried between tension straps 83. This wheel is connected to a hand knob 84 so that it may be rolled along the horizontal rack 85 when desired. The tension straps support a bail 86 which is connected to the extrusion head at a location near the center of balance. The head 28 is provided with a vertical plate 87 having ports 88 and 89 which are adapted to be aligned with registering ports 90 and 91 respectively provided in the vertical plate 92 mounted on the frame 10. The plates 87 and 92 are provided with matching ground surfaces to prevent leakage when the plates meet in metal-to-metal contact. Suitable packing rings (not shown) encircling the ports may be utilized if desired to supplement the seal provided by the ground surfaces. Channel strips 93 and 94 are positioned above and below the matching plates 87 and 92 and when clamped together by means of vertical bolts 95 serve to hold the vertical plates 87 and 92 in sealing relationship. These bolts are conveniently actuated by means of cam levers 96 connected to the upper ends of the bolts. When it is desired to remove the extrusion head 28 from the base 10 the cam levers 96 are moved from the locked position shown in Figure 1 to the unlocked position shown in Figure 2, thereby permitting separation of the channel retainers 93 and 94 under action of the expansion springs 97. The bolts 95 are each slidably mounted in central guides fixed to the stationary plate 92, and the lower ends of the bolts are secured to the lower channel retainer 94. One end of each spring 97 engages a bolt-encircling bushing and the other end engages one of the central bolt guides. When the cam levers 96 are turned to their unlocked position, the upper springs 97 raise the upper channel retainer 93 and the lower springs 97 depress the lower channel retainer 94. The extrusion head 28 may be then moved away from the frame and is conveniently supported by means of the tension straps 83 and bail 86 from the horizontal arm 81.

Figure 7:
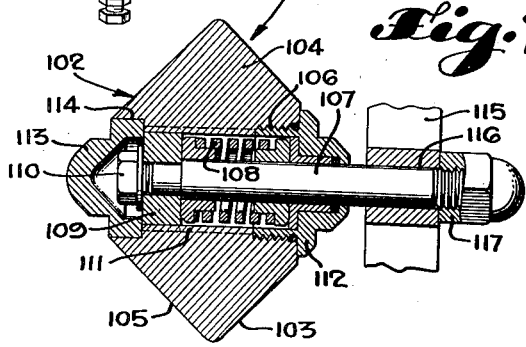
Figure 7 is a sectional detail taken substantially on the lines 7—7 as shown in Figure 3.

Counterbores 98 are provided in the vertical plate 87 encircling the ports 88 and 89. These counterbores are adapted to receive the flange 99 of a conical valve seat member 100. This valve seat member is mounted within the head 28 and is provided with a frusto-conical sealing surface 101. A check valve 102 is provided with a sealing surface 103 adapted to rest against the surface 101. As shown in Figure 7 this check valve 102 may include a solid circular disc 104 having the sealing surface 103 on one side and the tapering surface 105 on the other. The disc 104 is provided with an axial opening 106 adapted to receive a stationary rod 107 and a compression spring 108 encircles the rod. A floating collar 109 is secured on the inner end of the rod 107 by means of the nut 110, and this collar is adapted to slide in axial keyways 111. Closure 112 is threaded into one end of the opening 106 and acts to maintain the parts in assembled relationship. A cover 113 may be brazed into the counterbore 114 to enclose the nut 110. Construction of the valve assembly is such that the spring 108 acts to move the disc 104 toward the right as viewed in Figure 7 when the rod 107 is held stationary.

A spider or crowfoot 115 is provided with a central aperture 116 for reception of the outer end of the rod 107, and the legs of this crowfoot rest against the inner conical surface of the insert member 100 as shown in Figure 3. A retaining nut 117 is secured to the outer end of the rod 106 and rests against the crowfoot 115. It will be observed that these check valves act to prevent return flow from the extrusion head to the feed cylinders and are so constructed that the working parts of the valve assembly are enclosed and maintained out of contact with the food product material which is to be extruded.

A vertical plate 120 mounted on the frame 10 separates the feed cylinder assemblies 21 and 22 from the power cylinder assemblies 15 and 16. Suitable screw connections 121 extend through this vertical plate to secure the cylinder assemblies 15 and 16 in operative position. Similarly, screw fittings 131 extend through this plate to hold the feed cylinders 21 and 22 in operative position. Suitable hydraulic leads are provided to each end of the double acting cylinder assemblies 15 and 16 so that the piston rods 17 and 18 may be reciprocated as desired. Each of the feed pistons 19 and 20 is provided with a horizontal trip tube 123 and 124 which are fixed thereto and extend in directions parallel to the piston rods 17 and 18 in telescopic relation with respect to the stationary guide rods 123a and 124a respectively. Each of these tubes 123 and 124 is secured to its respective piston by means of screw fittings 132 and extends through an aperture 133 provided in the vertical plate 120. Trip fingers 125 and 126 are adjustably mounted on each of these tubes and are adapted to contact spaced electric switches 127 and 128 of the Mercoid type, and also to engage valve-operating plungers 129 and 130. The electric switches 127 and 128 are adapted to energize the signal lamps 146 and 147 respectively.

The general scheme of operation requires that the feed pistons 19 and 20 advance sequentially within their respective cylinders 21 and 22. A ball of dough formed of cooked cornmeal or the like is loaded into a cylinder 22 through the filler opening 24 when the feed piston 20 is in its retracted position as shown in Figure 3. Hydraulic fluid from the pump 14 is delivered under pressure to the rear end of the pressure cylinder 16, thereby causing the feed piston 20 to move forwardly in the cylinder 22. The ball of dough is trapped ahead of the piston 20 and is confined under pressure within the forward end of the feed cylinder 22.

Figure 9:
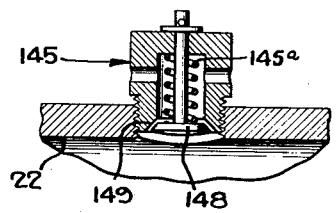
Figure 9 is a sectional elevation taken substantially on the lines 9—9 as shown in Figure 3 and showing details of construction of one of the vent valves.

A vent valve assembly generally designated 145 is provided near the forward end of each of the feed cylinders in order to permit entrapped air to escape so that the entire mass of material ahead of the feed piston may comprise dough material to be extruded. As shown in Figure 9, the spring 145a acts to move the valve member 148 away from its seat 149. As the feed piston 20 continues its forward movement within the cylinder 22 the entrapped air is bled off through the vent valve 145 and the ball of dough takes the shape of the forward end of the cylinder and fills all of the space therein, the dough mechanically closing the valve 145. The valve 26 does not open to permit flow of dough material into the passageway 27 until the pressure against the feed piston 20 exceeds the pressure in the passageway 27 by a sufficiently large differential to open the valve 26 against the action of the internal spring 108. As soon as the valve 26 opens, the valve 25 closes and the piston 19 is retracted to the rear end of the feed cylinder 21.

Figure 6:
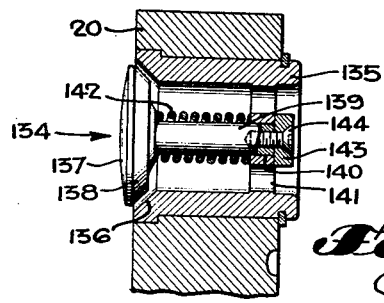
Figure 6 is a sectional detail taken substantially on the lines 6—6 as shown in Figure 3.

A check valve assembly 134 is provided in each of the pistons 19 and 20. As shown in detail in Figure 6, each of these check valve assemblies 134 may include a sleeve insert 135 having a seat 136. A poppet-type valve 137 has a sealing surface 138 adapted to rest on the seat 136. The valve stem 139 extends through the guide 140 provided in the ported bridge 141. A compression spring 142 encircling the stem 139 acts against the valve head at one end and against the ported bridge 141 at the other so that the valve is biased toward an open position. A retaining collar 143 is secured to the inner end of the stem 139 by means of attachment fitting 144 to hold the parts in assembled relationship. The valve 137 is closed against the seat 136 by contact with the dough material, and opens to break the vacuum to allow the piston to retract.

When the piston 19 reaches the end of its rearward travel the signal lamp 146 is energized to indicate that a ball of dough should be placed in the filler opening 24 leading to the feed cylinder 21. When such a dough ball is placed in the cylinder 21 the power cylinder assembly 15 is caused to move the piston 19 forwardly. Air entrapped ahead of the piston 19 escapes through the bleed valve 145 at the forward end of the cylinder 21. The timing sequence of the feed pistons 19 and 20 is such that the pressure of the dough material in advance of the piston 19 does not equal the pressure in the passage 27 until the piston 20 nears the end of its forward stroke. When the pressure ahead of the piston 19 exceeds the pressure in the passageways 27, the check valve 25 opens and the check valve 26 closes. The feed piston 20 is retracted, the signal lamp 147 is lighted, and the cycle of operation repeats. From this description it will be understood that the pressure in the passage 27 is maintained substantially constant although the passage is fed alternately from one of the two feed cylinders 21 and 22.

Means are provided for effecting operation of the feed pistons 19 and 20 in order to accomplish the general cycle of operation outlined above. As shown in Figure 11 of the drawings, the double pump unit 14 which is driven from the motor 13 includes a high pressure low volume pump 150 and a low pressure high volume pump 151. The discharge from the pump 150 is connected to a pair of metering valves 152 and 153 which are adjustable so that a metered flow of pressure fluid is present at all times in the hydraulic lines 154 and 155 on the downstream side of the metering valves 152 and 153 respectively. A hydraulic line 156 connects the discharge lines 154 and 155, and interposed in this line is a pair of check valves 157 and 158. The discharge from the low pressure pump 151 is connected to the line 156 between the check valves 157 and 158. From this description it will be understood that, so long as the double pump unit 14 is driven, fluid under pressure is supplied to the terminal points 159 and 160.

Assuming that the feed piston 19 is being caused to move forwardly to extrude dough material while the feed piston 20 is being maintained in the retracted position, pressure fluid passes from the metering valve 152 through hydraulic line 161 to the inlet 162 of the four-way control valve generally designated 163. Pressure fluid admitted into the inlet 162 passes into the outlet 164, the movable spool valve 165 being positioned as shown diagrammatically in Figure 12. A hydraulic line 166 connects the rear end of the pressure cylinder 15 to the sequence valve 167. This sequence valve may be set so that it remains closed for pressures up to a predetermined value and then opens to connect the line 166 with the line 168 when the pressure exceeds that value. The line 168 is connected through the manual control valve 169, and in the portion of the cycle of operations now under consideration this valve connects through line 187 to the pilot piston in the small end of valve 172. The principal flow of pressure fluid from the outlet 164 is to the cylinder 15. The discharge from the low pressure pump 151 passes through check valve 157 to the terminal point 159 by way of the four-way control valve 163, and the discharge from the high pressure pump 150 is delivered to the same point. The relatively high rate of flow delivered by the pump 151 then causes the piston 170 in the cylinder 15 to advance at a relatively rapid rate until such time as the feed piston 19 begins to extrude the ball of dough within the feed cylinder 21. The increased resistance requires greater pressure to move the piston 170 forward in the cylinder 15, and accordingly the check valve 157 closes, cutting off the supply of low pressure fluid from the pump 151 and admitting only the smaller flow of high pressure fluid from the high pressure pump 150. The rate of movement of the piston 170 within the cylinder 15 is then determined by the setting of the metering valve 152, and this in turn controls the rate of extrusion of the dough through the extrusion orifice.

When the trip finger 125 on the trip tube 123 contacts the valve operating plunger 129, the four-way pilot valve 188 is caused to bring the feed piston 20 into operation. The four-way pilot valve then disconnects the hydraulic line 171 from the line 173 and connects the larger diameter end of the four-way valve 172 to the drain pipe 122 by way of the hydraulic line 173. The internal construction of the four-way control valve 172 is substantially identical to that of the four-way valve 163 as shown diagrammatically in Figures 12 and 13. Pressure fluid is admitted to the small end of the four-way control valve 172 by way of the line 187 leading from the manual control valve 169. The effect of delivering pressure fluid to the small diameter end of the four-way valve 172 is to connect the hydraulic line 174 leading from the terminal point 160 to the outlet 175 communicating with the rear end of the cylinder 16 by way of the hydraulic line 176. The hydraulic line 176 is also connected to the sequence valve 177 which is substantially a duplicate of the sequence valve 167 and is set at the same pressure value. When the pressure in the line 176 exceeds such value, the sequence valve 177 opens to connect the line 176 with the manual control valve 178 by way of hydraulic line 179.

The relatively low pressure required to move the piston 180 under rapid traverse is insufficient to cause the sequence valve 177 to open so that the pressure fluid in the hydraulic line 176 acts to move the piston 180 forwardly in the cylinder 16. The piston 180 moves rapidly under the high volume and low pressure provided by the pump 151 until the feed piston 20 encounters resistance against the ball of dough in the feed cylinder 22. Upon encountering such resistance the pressure required to continue moving the piston 180 increases. At this time the check valve 158 closes and the piston 180 moves forwardly under the high pressure low volume output of the pump 150. At this instant both feed pistons 19 and 20 are then applying maximum pressure against their respective balls of dough. This pressure then opens the sequence valve 177 and the pressure fluid passes by way of manual control valve 178 and hydraulic line 181 to the small diameter end of the four-way control valve 163. The central spool 165 is shifted from the position shown in Figure 12 to the position shown in Figure 13, so that the pressure fluid to the outlet 164 is shut off and instead pressure fluid is delivered into the outlet 182 which communicates with the forward end of the cylinder 15. The piston 170 then begins its retracting movement toward the rear end of the cylinder under rapid traverse. The piston 170 reaches the rear end of the cylinder 15 and remains at rest while the forward motion of the piston 180 continues at relatively slow speed under high pressure.

When the adjustable finger 126 on the trip tube 124 engages the valve operating plunger 130 on the four-way pilot valve 183, the hydraulic line 185 is connected to the hydraulic line 184 so that pressure fluid is delivered to the large diameter end of the four-way valve assembly 163, thereby shifting the spool 165 back to the position shown in Figure 12. The spool shifts to the left as shown in Figure 12 even though pressure exists in the small diameter end because of the larger area of the large diameter end of this valve assembly. The piston 170 is then caused to move forwardly in the cylinder 15 since the pressure fluid from the line 161 passes through inlet 162 and through outlet 164 into the hydraulic line 166. When the ball of dough ahead of the feed piston 19 builds up sufficient resistance, the pressure in the cylinder 15 reaches a value above that for which the sequence valve 167 is set. Accordingly, the sequence valve 167 opens, admitting pressure fluid through line 168, manual control valve 169, and line 187 into the small diameter end of the four-way control valve 172. This causes the piston 180 to retract within the cylinder 16.

This cycle of operations continues so long as balls of dough are supplied to the respective feed cylinders. The trip fingers 125 and 126 are so positioned with respect to their respective trip tubes 123 and 124 that the actuation of the four-way pilot valves 198 and 183 occurs when the respective feed piston is very near the end of its forward stroke.

The machine is arranged so that it may be operated from either side. The various valves in the hydraulic system as shown diagrammatically in Figure 11 are mounted on parallel panels which are substantially duplicates. As shown in Figure 1 each of these panels may be arranged with the metering valve at one end of the panel and the four-way control valve at the other end. The panel shown in Figure 1 includes the metering valve 153, the check valve 158, the manual control valve 178, the four-way pilot valve 183, the adjustable sequence valve 177, and the four-way control valve 172. The counterpart for each of these valves as shown is mounted on the duplicate panel on the other side of the machine.

From the above description it will be understood that each four-way pilot valve initiates forward movement of the feed piston on the other side of the machine. Retracting movement of each of the feed pistons is initiated by the pressure relief valve on the other side of the machine.

As shown in Figure 10, the four-way pilot valve 183 is operated by a plunger 188 carrying a cam follower 189. The plunger 188 is spring loaded to hold the cam follower 189 against the underside of the cam 190 which is fixed on the stub shaft 191. One end of the stub shaft 191 is connected to a universal joint 192 and its other end is connected to a manual operating lever 193. A bearing sleeve 194 is provided for the shaft 191, and this bearing sleeve is fixed to the lower end of the vertically reciprocable plunger 130 which is slidably mounted within a guide sleeve 195 carried on the frame. The roller 196 carried on the plunger 130 is adapted to be contacted by the finger 126 which is adjustably mounted on the trip tube 124. When the trip finger 126 contacts the roller 196 it moves the plunger 130 downwardly within the guide sleeve 195 and moves the shaft 191 downwardly with it, thereby causing the cam 190 to depress the roller 189 and valve plunger 188.

The universal joint 192 is connected to a cross-shaft 197 which extends across the machine to the control panel on the other side thereof where it connects to a structure identical to that shown in Figure 10 for operating the other four-way pilot valve 198. The manual control lever 193 on the shaft 191 may be actuated to rotate the cam 190 and thereby actuate the four-way pilot valve 183 when desired. This manual control lever 193 also acts through the cross-shaft 197 to actuate the four-way pilot valve 198 on the other control panel; that is, both valves may be operated in unison from either side of the machine and the cams are shaped so that when one pilot valve is opened the other is closed. The universal joints 192 at opposite ends of the cross-shaft 197 permit the plungers 129 and 130 to move vertically independently of each other. The principal usefulness for the manual control levers 193 is to provide a means for changing the normal cycle of operation of the feed pistons for tests, inspection, repair, etc.

The manual control valves 169 and 178 normally connect their respective pressure relief valves to the four-way control valve on the other side of the machine. Actuation of either of these manual control valves has the effect of supplying pressure from the hydraulic lines 199 and 200 to the four-way control valves on the other side of the machine, so that if it should be necessary to shift the position of the spools 165 within the four-way control valves for any reason this may be accomplished without requiring that the feed pistons of the machine go through any portion of their cycle. In other words, these manual control valves 169 and 178 provide convenient means for shifting the position of the spools 165.

It will be understood that the four-way control valves, pressure relief valves, and manual control valves are each provided with a connection to drain. These valves are of conventional type and the drain connections are likewise conventional, although they are not specifically identified by numerals.

Having fully described my invention, it is to be understood that I do not wish to be limited to the details herein set forth, but my invention is of the full scope of the appended claims.

I claim:

1. In an extrusion device, the combination of a casing member having a longitudinal opening; a stem member extending longitudinally through said opening and cooperating with the casing member to define an annular passageway, said members being mounted for relative longitudinal movement; cooperating parts at one end of said members forming a ring orifice; said cooperating parts including stop shoulders axially engageable to limit the minimum width of the ring orifice; means at the other end of said members for effecting relative longitudinal movement between them, whereby the width of said orifice may be increased, said means including a nut positioned outside the casing member and threadedly connected to the stem member, and key means for preventing relative turning between said members; and inlet means in the casing member intermediate the ends thereof whereby a material to be extruded through the orifice may be admitted into the annular passageway.

2. In an extrusion device, the combination of a casing having a vertical opening; a non-rotary vertical stem extending longitudinally through said opening and cooperating with the casing to define an annular passageway; an annular element fixed on the casing closing one end of the opening, the stem being mounted for vertical movement relative to said annular element; cooperating parts at the lower end of the casing and stem forming an orifice; said cooperating parts including stop shoulders axially engageable to limit the minimum width of the ring orifice; adjustment means at the upper end of said stem for effecting vertical movement thereof, whereby the width of said orifice may be increased, said means including key means on the annular element for preventing relative turning between said members; and inlet port means in the casing member intermediate the ends of the opening whereby a material to be extruded through the orifice may be admitted into the annular passageway.

3. In an extrusion device, the combination of a casing having a vertical opening; a non-rotary vertical stem extending longitudinally through said opening and cooperating with the casing to define an annular passageway; an annular element fixed on the casing closing one end of the opening, the stem being mounted for vertical movement relative to said annular element; cooperating parts at the lower end of the casing and stem forming a ring orifice extending horizontally therearound; adjustment means at the upper end of said stem for effecting vertical movement thereof, whereby the width of said ring orifice may be varied, said means including a thrust bearing on the annular element, a nut mounted on the thrust bearing and threadedly connected to the stem member, and key means on the annular element for preventing relative turning between said members; and inlet port means in the casing member intermediate the ends of the opening whereby a material to be extruded through the ring orifice may be admitted into the annular passageway.

4. In an extrusion device, the combination of a casing having a longitudinal opening terminating in a downwardly extending rim; a stem extending longitudinally through said opening and cooperating with the casing to define an annular passageway, the stem being mounted for longitudinal movement in the passageway and having a cap thereon cooperating with the rim to form a ring orifice; key means for preventing relative rotation between the stem and the casing; means on said stem remote from said orifice for effecting relative longitudinal movement of the stem whereby the width of said orifice may be varied; and stop means on the cap for limiting movement of the stem in one direction, the stop means including a plurality of circumferentially spaced projections adapted to engage the lower end of the rim, the cap having slots defined between adjacent projections through which material may be extruded while the projections are in contact with the rim.

5. In an extrusion device, the combination of a casing having a longitudinal opening terminating in a downwardly extending rim; a stem extending longitudinally through said opening and cooperating with the casing to define an annular passageway, the stem being mounted for longitudinal movement in the passageway and having a cap thereon cooperating with the rim to form a ring orifice; means on said stem remote from said orifice for effecting relative longitudinal movement of the stem whereby the width of said orifice may be varied; key means for preventing relative rotation between the stem and the casing; and a series of radial fins on the cap slidably mounted within the rim and adapted to separate the material extruded through the ring orifice into a plurality of strips.

6. In a device of the class described having an extrusion head provided with a passageway, the combination of: a first feed cylinder assembly operatively connected to said passageway; a second feed cylinder assembly operatively connected to said passageway, each of said cylinder assemblies having a check valve associated therewith and operatively interposed between each assembly and said passageway, each check valve acting to permit flow from its respective feed cylinder assembly toward the extrusion orifice but acting automatically to prevent return flow, each of said cylinder assemblies including a piston reciprocable within a cylinder; power means for sequentially actuating said pistons; and control means associated with said power means adapted to maintain pressure on one feed piston at the end of its operative stroke until that pressure is substantially equalled by the pressure on the other piston whereby the pressure in said passageway is maintained substantially constant.

7. In a device of the class described having an extrusion head provided with a passageway, the combination of: a plurality of reciprocating feed means each operatively connected to deliver material into said passageway, each of said means having a check valve associated therewith automatically acting to prevent return movement of material into the feed means; power means for sequentially actuating said feed means; and timing means associated with said power means adapted to maintain pressure on one feed means at the end of its operative stroke until that pressure is substantially equalled by the pressure on another feed means, whereby the pressure in said passageway is maintained substantially constant throughout the operating cycle of the feed means.

8. In a device of the class described having an extrusion head provided with a passageway, the combination of: a first piston and cylinder assembly operatively connected to said passageway; a second piston and cylinder assembly operatively connected to said passageway, each of said cylinder assemblies having a spring urged check valve associated therewith and operatively interposed between each cylinder assembly and said passageway, each check valve acting to permit flow from its respective cylinder assembly toward said passageway but acting automatically to prevent return flow, each of said cylinder assemblies including a power piston reciprocable within a cylinder; means for supplying fluid under pressure for sequentially actuating said pistons, said means being adapted to maintain pressure on one power piston at the end of its operative stroke until that pressure is substantially equalled by the pressure on the other power piston whereby the pressure in said passageway is maintained substantially constant.

9. In an extrusion device having an extrusion head provided with a passageway leading to a ring orifice, the combination of a cutter encircling the ring orifice and mounted for reciprocation relative to the extrusion head; means providing a floating mounting for said cutter between opposed compression springs, said mounting normally maintaining the cutter on one side of the orifice; means independent of the springs for adjusting the normal position of the cutter; and positive means for moving the cutter including a rotary cam adapted to move the cutter in a direction to compress one of the springs, the cutter being moved in the other direction across the orifice by the energy in the compressed spring.

10. In an extrusion device having an extrusion head provided with a passageway leading to an extrusion orifice, the combination of a plurality of reciprocable feed elements each operatively connected to said passageway; means for reciprocating said feed elements comprising a piston and cylinder assembly associated with each, said assemblies each including a power piston reciprocable within a power cylinder; means for alternately introducing pressure fluid into opposed ends of said power cylinders for reciprocating the power pistons in sequence, said means including a control valve associated with each power cylinder, each control valve having pressure responsive means operatively connected to actuate it; and hydraulic connections for transmitting fluid pressure from each power cylinder to one of said pressure responsive means whereby each control valve may be actuated by increase in pressure in another power cylinder.

11. In an extrusion device having an extrusion head provided with a passageway leading to an extrusion orifice, the combination of a pair of reciprocable feed elements each operatively connected to said passageway; a check valve interposed between each feed element and said passageway; means for reciprocating said feed elements comprising a piston and cylinder assembly associated with each, said assemblies each including a power piston reciprocable within a power cylinder; means for alternately introducing pressure fluid into opposed ends of said power cylinders for reciprocating the power pistons in sequence, said means including a control valve associated with each power cylinder, each control valve having pressure responsive means operatively connected to actuate it; and hydraulic connections for transmitting fluid pressure from each power cylinder to one of said pressure responsive means whereby each control valve may be actuated by increase in pressure in the other power cylinder.

12. In an extrusion device having an extrusion head provided with a passageway leading to an extrusion orifice, the combination of a pair of reciprocable feed elements each operatively connected to said passageway; means for reciprocating said feed elements; said means including a pair of power cylinders each having a power piston reciprocable therein; a separate control valve for each of said power cylinders, hydraulic conduits connecting each control valve to the opposed ends of the cylinders; means for supplying fluid under pressure to said control valves; trip means associated with each power piston adapted to be actuated upon predetermined travel of the piston; hydraulic means operatively connecting each trip means with the control valve for the other piston, whereby forward movement of each piston is initiated by predetermined travel of the other piston; a pressure responsive sequence valve for each of the power cylinders each operatively connected to the rearward end of one of said cylinders; and hydraulic connections whereby each sequence valve may actuate the control valve for the other piston to initiate retracting movement of the other piston when the pressure in the rearward end of its respective cylinder exceeds a predetermined value.

13. In an extrusion device, a pair of power cylinders each having a power piston reciprocable therein, a separate control valve for each of said power cylinders, hydraulic conduits connecting each control valve to the opposed ends of the cylinders; means for supplying fluid under pressure to said control valves; trip means associated with each power piston adapted to be actuated upon predetermined travel of the piston; hydraulic means operatively connecting each trip means with the control valve for the other piston, whereby forward movement of each piston is initiated by predetermined travel of the other piston; a pressure responsive sequence valve for each of the power cylinders each operatively connected to the rearward end of one of said cylinders; and hydraulic connections whereby each sequence valve may actuate the control valve for the other piston to initiate retracting movement of the other piston when the pressure in the rearward end of its respective cylinder exceeds a predetermined value.

14. In an extrusion device having an extrusion head provided with a passageway leading to an extrusion orifice, the combination of a pair of reciprocating feed elements operatively connected to said passageway; a check valve interposed between each of the feed elements and said passageway, each of the check valves including a relatively stationary stem and a head movable on the stem and adapted to engage a seat, the head having a central opening; a compression spring enclosed within said opening, and confined within the head, the spring normally acting to move the head in a direction to engage the seat.

15. In an extrusion device having an extrusion head provided with a passageway leading to a ring orifice, the combination of a cutter encircling the ring orifice, means providing a floating mounting for said cutter between opposed compression springs, said mounting normally maintaining the cutter on one side of the orifice, means independent of the springs for adjusting the normal position of the cutter at rest with respect to the orifice, and power means independent of the springs for positively moving the cutter in one direction to compress one of the springs, the cutter being moved in the other direction across the orifice by the energy in the compressed spring.

16. In an extrusion device having an extrusion head provided with a passageway leading to an extrusion orifice, the combination of a plurality of reciprocable feed elements each operatively connected to said passageway, means for reciprocating said feed elements comprising a piston and cylinder assembly associated with each of said feed elements, said assemblies each including a power piston reciprocable within a power cylinder, means for alternately introducing pressure fluid into opposed ends of said power cylinders for reciprocating the power pistons in sequence, said last named means including a control valve associated with each power cylinder, a pressure responsive sequence valve for each of the power cylinders, and conduit means operatively connecting each sequence valve to the rearward end of one of said cylinders and to each of said control valves, each sequence valve acting upon increase in pressure in the rearward end of its respective cylinder above a predetermined value to cause the control valve for another cylinder to initiate retracting movement of the power piston therein.

17. In an extrusion device having an extrusion head provided with a passageway leading to an extrusion orifice, the combination of a pair of reciprocable feed elements each operatively connected to said passageway, a check valve interposed between each feed element and said passageway, means for reciprocating said feed elements comprising a piston and cylinder assembly associated with each of said feed elements, said assemblies each including a power piston reciprocable within a power cylinder, means for alternately introducing pressure fluid into opposed ends of said power cylinders for reciprocating the power pistons in sequence, said last named means including a control valve associated with each power cylinder, a pressure responsive sequence valve for each of the power cylinders, and conduit means operatively connecting each sequence valve to the rearward end of one of said cylinders and to each of said control valves, each sequence valve acting upon increase in pressure in the rearward end of its respective cylinder above a predetermined value to cause the control valve for the other cylinder to initiate retracting movement of the power piston therein.

18. In an extrusion device, the combination of an extrusion head having a passageway leading to an extrusion orifice, a feed cylinder assembly operatively connected to said passageway, a check valve positioned between the feed cylinder assembly and passageway acting automatically to permit flow from the assembly to the passageway but to prevent return flow, the feed cylinder assembly including a piston reciprocable within a cylinder, and a vent valve assembly associated with the cylinder positioned near the check valve, the vent valve assembly including a movable element opening inwardly of the cylinder, a spring biasing the valve element toward open position so that air trapped within the cylinder during forward motion of the piston may escape from the cylinder, the vent valve being closed by mechanical contact with the material being extruded during forward motion of the piston.

19. In an extrustion device, the combination of an extrusion head having a passageway leading to an extrusion orifice, a feed cylinder assembly operatively connected to said passageway, a check valve positioned between the feed cylinder assembly and passageway acting automatically to permit flow from the assembly to the passageway but to prevent return flow, the feed cylinder assembly including a piston reciprocable within a cylinder, and a vent valve assembly mounted on the piston and including a movable valve element opening in the direction of forward movement of the piston, a spring biasing the valve element toward open position so that atmospheric air may enter the cylinder during retracting movement of the piston, the movable valve element being closed by direct contact with material to be extruded during forward motion of the piston.

20. In an extrusion device, the combination of: a casing having a vertical opening, a non-rotary vertical stem extending longitudinally through said opening and cooperating with the casing to define an annular passageway, guide means at the upper end of the casing for guiding the stem for vertical movement thereon, said guide means including a sealing element slidably engaging the stem, cooperating parts at the lower end of the casing and stem forming a ring orifice extending horizontally therearound, adjustment means at the upper end of said stem for effecting vertical movement thereof, whereby the width of said ring orifice may be varied, said adjustment means including a thrust bearing supported on the casing, the stem having external threads on the upper end thereof, a nut mounted on the thrust bearing and having internal threads engaging said stem threads, and means for preventing relative turning movement between said stem and casing, said means last named including an axial keyway formed in the stem and intersecting said threads, the keyway terminating short of said portion of the stem which is contacted by said sealing element, and a key fixed relative to the casing extending into said keyway.

21. In an extrusion device having an extrusion head provided with a passageway leading to a ring orifice, the combination of: a cutter encircling the ring orifice, parallel rods positioned on diametrically opposite sides of the cutter, means securing the rods to the cutter, a guide bushing encircling a portion of each rod, means adjustably mounting each guide bushing relative to the extrusion head, the rods being axially slidable in said guide bushings, springs resisting axial movement of the rods in one direction, and power means for moving the rods and cutter in said direction to compress the springs, the rods and cutter being moved in the other direction by the energy in the compressed springs.

LEONIDAS C. MILLER.

References Cited in the file of this patent

UNITED STATES PATENTS

| Number | Name | Date |
|---|---|---|
| 1,264,533 | Laskey | Apr. 30, 1918 |
| 1,670,230 | Bauman | May 15, 1928 |
| 1,702,191 | Bergner | Feb. 12, 1929 |
| 1,793,207 | Bergner | Feb. 17, 1931 |
| 2,178,261 | Lagaard | Oct. 31, 1939 |
| 2,262,485 | Belshaw | Nov. 11, 1941 |
| 2,313,949 | Lagaard | Mar. 16, 1943 |
| 2,366,417 | MacMillin | Jan. 2, 1945 |
| 2,536,649 | Lindsey | Jan. 2, 1951 |

FOREIGN PATENTS

| Number | Country | Date |
|---|---|---|
| 648,891 | Germany | Aug. 12, 1937 |